June 11, 1929.  M. CREMER  1,717,191
TIME ELEMENT ELECTRORESPONSIVE DEVICE
Filed Aug. 15, 1925
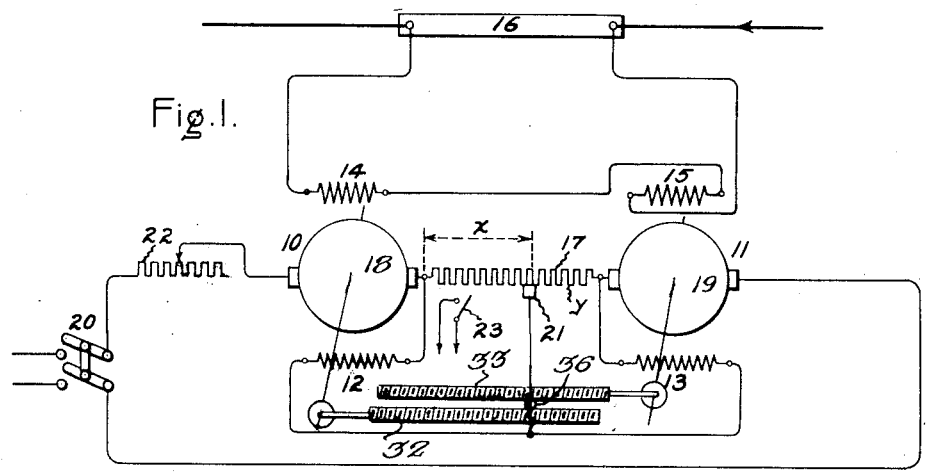
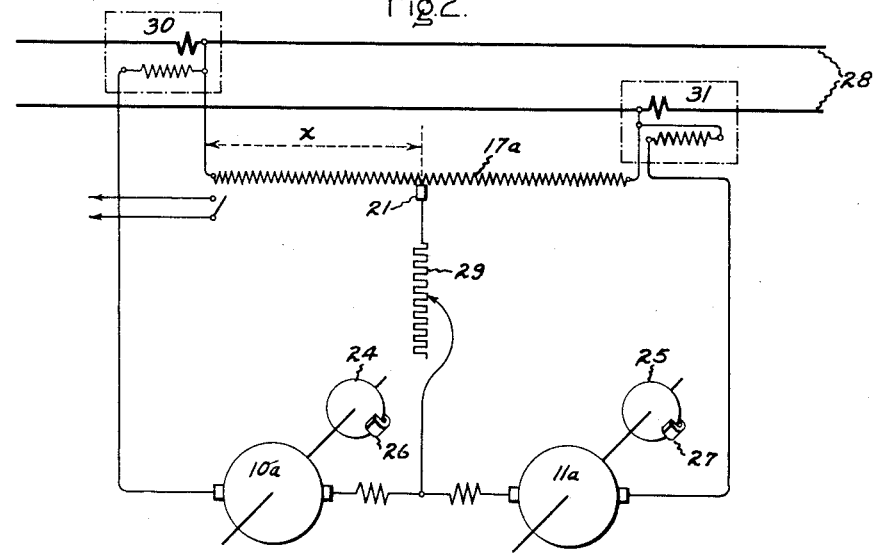
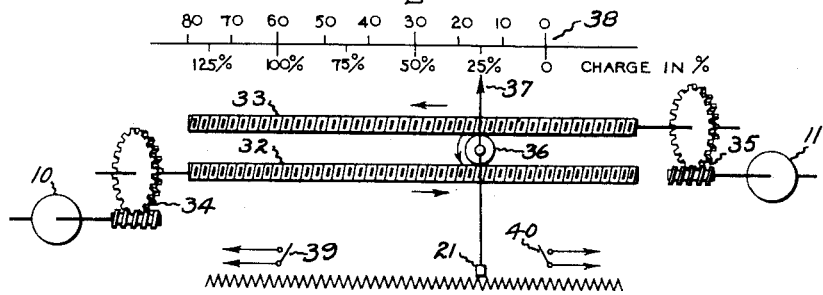
Inventor:
Michel Crémer,
by
His Attorney.

Patented June 11, 1929.

1,717,191

UNITED STATES PATENT OFFICE.

MICHEL CREMER, OF PARIS, FRANCE, ASSIGNOR TO GENERAL ELECTRIC COMPANY, A CORPORATION OF NEW YORK.

TIME-ELEMENT ELECTRORESPONSIVE DEVICE.

Application filed August 15, 1925, Serial No. 50,534, and in France September 8, 1924.

My invention relates to electroresponsive indicating or controlling devices, and more particularly to indicating or controlling devices that operate responsively to an electrical characteristic, such as current, voltage, or the like, with a continuously varying rate of speed.

The object of the invention is to provide a device of the above character capable of operating in accordance with a predetermined exponential function which varies with the time, such as the temperature rise resulting from current flowing through an electrical conductor, or any like function of current, voltage, or other electrical characteristic.

More specifically, the present invention provides a time element electroresponsive device which may be arranged to indicate the variations in temperature of electrical translating apparatus or cable systems due to the current flowing therein, as well as to perform a desired controlling operation when the temperature of the electrical apparatus or cable system reaches predetermined values.

It is well known that the temperature rise of any electrical conductor varies as a function of time, as well as a function of the current flowing therein under constant ambient temperature conditions. Where the current flow is substantially constant the temperature rise of the electric conductor varies in accordance with an exponential function of the time during which the current flows. By means of my invention an electroresponsive device energized responsively to the current flowing through the electric conductor may be made to operate at a continuously varying rate of speed corresponding to the exponential function which determines the resulting rise in temperature of the electric conductor.

All time element relays which have been employed heretofore for the protection of electrical machinery against excessive temperature conditions roughly may be divided into two classes. The first class includes those which function with an arbitrary time delay upon an overload current flowing through the device to be protected. When once set into operation they produce a desired controlling action, such as signaling or interrupting the circuit with a delay, the duration of which ordinarily is inversely proportional to the value of the current flowing in the circuit. With this class of apparatus dashpots, cohesion disks, or other well known forms of time delaying apparatus, have been employed for producing the time delay action. However, it will be evident that the time delay bears no fixed relation to the actual temperature rise of the electrical apparatus which is to be protected.

On the other hand, a second class of temperature relays are of the type which are intended to be heated in such a way that their temperature rise in proportional to that of the electrical apparatus which they protect. While theoretically perfect, this class of temperature relays has certain practical disadvantages and inconveniences, notably the difficulty of varying their inherent time characteristics, their sensibility to ambient temperature conditions different from those of the machine to be protected, as well as their complexity and cost.

Although not necessarily limited to a temperature protective device, the present invention permits an electro-responsive device to be operated in accordance with the temperature rise of an electric translating device, such as a motor, generator, or the like, or a cable system, without in any way reproducing the thermal conditions of the protected device or imposing an arbitrary time delay upon the action of the device. Furthermore, by means of the present invention a movable indicator may be operated so as to accurately indicate on a dial the temperature rise of the apparatus protected.

In order to more fully explain the salient features of construction and operation of my invention, preferred forms of the invention embodied in time element temperature relays for both direct and alternating current service are illustrated in the accompanying drawing.

Fig. 1 is a circuit diagram showing a temperature relay adapted for use with direct current circuits; Fig. 2 is a circuit diagram of the temperature relay arranged for alternating current circuits; and Fig. 3 shows diagrammatically the mechanical construction of certain parts of the temperature relays illustrated in Figs. 1 and 2.

Referring to Fig. 1, the direct current time element temperature relay comprises essentially two small compound wound direct current motors 10 and 11, each of which may be of 50 watts or so capacity. The motors are provided respectively with the field windings 12 and 13 which for convenience may be termed "shunt field windings" and the field windings 14 and 15, which likewise may be denoted as "series" or "compound windings". The compound windings 14 and 15 of the motors are connected in series across a shunt 16, which is inserted in the circuit of the electrical translating device or cable to be protected so as to be energized in accordance with the energizing current thereof.

The potentiometer 17 is connected in series with the respective armatures 18 and 19 of the motors in a circuit which is supplied through the switch 20 from a suitable direct current source, preferably of constant voltage.

The motor shunt windings 12 and 13 are energized from the potentiometer 17 through the movable brush 21 in such a way that if the brush 21 is at a distance $x$ from its extreme left position, as indicated in the drawing, the ampere turns of the winding 12 are equal to $kx$ and the ampere turns of the winding 13 are equal to $k(l-x)$, where $l$ represents the total length of the potentiometer. A resistance 22, which preferably is adjustable, is connected in the series circuit, including the armatures of the motors and the potentiometer 17, in order to control the value of the current flowing therein. If the ohmic values of resistance 22 and of the potentiometer 17 are sufficiently high to make the current passing through the motor armatures practically constant, irrespective of movement of the brush 21, the factor $k$ may be considered as constant.

The field windings 12 and 14 of the motor 10 are wound accumulatively, while the field windings 13 and 15 of the motor 11 are wound differentially. Thus, the ampere turns of the compound winding 14, which are added to those of the shunt winding 12, are equal to $b.I$, where $b$ is a constant and $I$ is the current which passes through the shunt 16. The ampere turns of the compound winding 15 also are equal to $b.I$, but due to the differential arrangement these ampere turns are subtracted from the shunt ampere turns of motor 11.

Hence, the final results are: that the total ampere turns of motor 10 are equal to $kx+b.I$ while those of motor 11 are $k(l-x)-b.I$.

Since the armatures of the two motors 10 and 11 are connected in series and the current passing therethrough is practically constant, the speed of motor 10 will be $$v_{10}=U.(kx+b.I)$$

while the speed of the motor 11 is $$v_{11}=U.[k(l-x)-b.I]$$

As shown diagrammatically in Fig. 3, the two motors 10 and 11 are mechanically connected to operate the sliding brush 21 through a differential mechanism including the worm shafts 32 and 33 and worm gear 36 interposed therebetween and connected to the brush 21 so that the brush 21 is moved in accordance with the difference between the respective speeds of the motors 10 and 11. The detailed arrangement of the differential drive mechanism is shown more fully in Fig. 3. Thus, it will be evident that if $v_{10}=v_{11}$, the sliding brush 21 remains stationary, and if one motor turns faster than the other the contact brush 21 moves in a corresponding direction. Since the displacement $dx$ of the contact brush 21 is proportional to the difference of speeds $v_{10}$ and $v_{11}$, this relation may be expressed as $$v_{10}dt-v_{11}dt=C.dx,$$

where $C$ is a constant denoting the reduction ratio of the differential gearing.

If now the values of $v_{10}$ and $v_{11}$ given above are substituted and the preceding equation be simplified, the following differential equation results:

$$(2U.b.I-U.k).dt=C.dx-(2U.k).x.dt$$

The integral of this equation between the limits $x=o$ and $x=x$ is:

$$X=\frac{2b.I.k}{2k}\cdot\left(l-e-\frac{t}{T}\right)$$

where $$T=\frac{C}{2U.k}$$

It will be observed that this solution is identical in form with the expression giving the heating of an electrical translating device or cable line, which with respect to the ambient temperature, has the following form:

$$t^o=t^o{}_{max}\left(l-e-\frac{t}{T}\right)$$

From the above it is seen that the movement of the contact brush 21 follows the same law as the heating of the electrical apparatus due to the current flowing through the shunt 16. It is clear that the time constant $$T=\frac{C}{2U.k}$$

of the time element temperature relay may be adjusted to conform to the particular heating characteristics of any electrical apparatus by modifying U, that is, by adjusting the rheostat 22, which simultaneously varies the speed of both the motors 10 and 11.

Thus, for each value of current I through the shunt 16, the sliding brush 21 is moved at a speed which varies asymptotically until the corresponding final position is reached. In each case the final position is represented by the equation $$X_{max}=\frac{2b.I-k}{2k}=m.I+n$$

If the time constants of the electrical apparatus and the relay are made equal, the sliding brush 21 may be provided with a pointer which cooperates with a scale as shown more in detail in Fig. 3, and the scale may be calibrated so that the position of the pointer will integrally indicate the thermal condition of the electrical apparatus with respect to a predetermined ambient temperature. Since the above equation of $X_{max}$ is of the first degree, this temperature scale is uniform and, therefore, easy to obtain. Where the electrical apparatus has a permissible temperature rise over the ambient of a given amount as for example 60°, the scale may, if desired, be calibrated in percentage of the permissible change as indicated in Fig. 3.

Where it is desired to automatically protect the electrical apparatus, suitable contact mechanism, such as the switch 23 indicated in the drawing, may be arranged to be actuated by the moving brush 21 when the maximum permissible temperature has been reached. It will be obvious that the switch 23 may be arranged to close the energizing circuit of an alarm signal or of a tripping magnet for a circuit interrupter controlling the energizing circuit of the protected electrical apparatus.

When the electrical apparatus is deenergized, current ceases to flow through the shunt 16 and the motor compound field windings 14 and 15 no longer are energized. Under these conditions the excitation of motor 10 due to the shunt winding 12 will be less than the excitation of motor 11 due to the shunt winding 13. Therefore, the sliding brush 21 will be moved to the right at a rate proportional to the cooling of the machine. Likewise, in case the current flow through the shunt 16 is decreased instead of being reduced to zero, the brush 21 will be moved to the right in accordance with an exponential function which is identical with that which gives the variations of temperature of the electrical apparatus at light loads.

In the modification of the time element relay for alternating current circuits illustrated in Fig. 2, the two small series motors $10_a$ and $11_a$ are connected to drive the sliding brush 21 of the potentiometer $17_a$ through a suitable differential mechanism in substantially the same manner as the motors 10 and 11 of Fig. 1. However, for the sake of clearness in the drawing this mechanism has been omitted but it will be understood that it may be of the form such as illustrated in Fig. 3. In order to render the speed of the series motors $10_a$ and $11_a$ substantially proportional to the voltage applied thereto, the motors are connected to drive the copper disks 24 and 25 respectively, which turn in the fields of the permanent magnets 26 and 27, thereby forming eddy current brakes.

For alternating current service the potentiometer $17_a$ is formed of a suitable impedance that may be permanently connected across the alternating current supply lines 28 which supply current to the electrical apparatus to be protected. The sliding brush 21 serves to divide the voltage of the supply lines 28 between the two motors $10_a$ and $11_a$ and the variable resistance 29 is inserted in the common circuit through which the two motors receive current from the potentiometer $17_a$ and the sliding brush 21. The secondary winding of the current transformer 30 is connected in series circuit with the motor $10^a$ and arranged so that the voltage produced by the current transformer 30 is added to that impressed upon the motor $10_a$ from the potentiometer $17_a$. The voltage produced in the secondary winding of the current transformer 31, which is connected in series circuit with the motor $11_a$ is arranged to oppose the voltage impressed upon the motor $11_a$ from the potentiometer $17_a$.

Since the speed of the two motors $10_a$ and $11_a$ is proportional to the voltage which is applied thereto, the arrangement shown in Fig. 2 will operate with respect to the displacement of the sliding brush 21 substantially in the manner as previously described in connection with the arrangement shown in Fig. 1. Thus, when properly calibrated, the displacement of the sliding brush 21 serves to render the rate of movement of the brush proportional to the variation in an exponential function which may be made to correspond to the rate of heating or cooling of the electrical apparatus supplied with power through the alternating current supply lines 28 by properly adjusting the resistance 29.

While the operating motors described above may be connected to operate the sliding brush 21 through various forms of differential mechanism, the arrangement shown in Fig. 3 preferably is employed. In this arrangement the motors 10 and 11 drive the parallel screws 32 and 33 through the worm gearing 34 and 35 respectively. The sliding brush 21 is connected to the rotatable pinion 36, which meshes with both the screws 32 and 33. The arrangement is such that the pinion 36 rotates about its axis as indicated by the arrow in the drawing, but does not move either to the right or to the left when the motors 10 and 11 run at the same speed. However, when the speeds of the motors 10 and 11 vary, the pinion 36 is moved in one direction or the other. For example, if the motor 11 runs faster than the motor 10, the pinion 36 will move to the left and thereby carry the pointer 37 along the scale 38 which may be calibrated to indicate the temperature of the protected electrical apparatus. The sliding brush 21 also is moved along with the pointer 37 and may be arranged to operate suitable switches 39 and 40 to effect a desired signaling or controlling action when the brush 21 is moved a predetermined amount.

Let us assume that motor 11 runs at 2500 R. P. M. and that motor 10 runs at 2250 R. P.

M., and that the ratio of each of the worm gears 34 and 35 is $\frac{1}{100}$. Under these conditions screw 33 will make 25 revolutions per minute, while the screw 32 will make 22.5 revolutions per minute. Consequently, the pinion 36 will move to the left at the rate of 2.5 threads per minute since the differential mechanism illustrated gives a very high reduction ratio. The speeds of the two motors 10 and 11 can be simultaneously changed by adjusting variable resistance 22 in the arrangement shown in Fig. 1 or the variable resistance 29 in the arrangement shown in Fig. 2.

While I have illustrated and described the motors 10 and 11 as responsive to the variations in current, it will be evident that the motor speed may be made responsive to variations in volts, watts, or other electrical characteristics as well as amperes.

What I claim as new and desire to secure by Letters Patent of the United States, is:—

1. A time element electroresponsive device comprising a movable member, actuating means therefor including normally opposed electroresponsive elements, each adapted to be energized in accordance with a common electrical characteristic and arranged to exert unequal and opposite actuating forces upon said member dependent upon the value of said electrical characteristic, and means operated responsively to the resultant movement of the member for equalizing the said actuating forces of said elements to maintain the rate of movement of the member in accordance with the rate of change of a predetermined exponential function of time.

2. A time element electroresponsive device comprising a movable member, electroresponsive means adapted to be energized responsively to an electrical characteristic and arranged to move the member to a position corresponding to the value of said electrical characteristic, and means controlled by the member arranged to control the actuating force of said electroresponsive means to render the rate of movement of the member proportional to the rate of variation in an exponential function dependent upon the said electrical characteristic.

3. A time element electroresponsive device comprising a movable member, cooperating electroresponsive actuating means therefor adapted to be energized responsively to the same current and arranged to exert unequal opposing actuating forces upon said member dependent upon the value of the current, and means operated responsively to the resultant movement of the member for simultaneously varying the opposing actuating forces of said electroresponsive actuating means to maintain the rate of movement of the member proportional to the rate of variation in an exponential function which depends upon the current.

4. In a time element electroresponsive device, the combination of a movable member, actuating means therefor comprising differentially connected electroresponsive elements adapted to be energized in accordance with a common electrical characteristic and arranged to exert unequal opposing actuating forces upon said member dependent upon the value of said electrical characteristic, means operated responsively to the resultant movement of the member for controlling the actuating forces of said elements to maintain the movement of the member in accordance with a predetermined function of time.

5. A time element electroresponsive device comprising a movable member, electroresponsive actuating means therefor adapted to be energized responsively to the flow of current in a conductor, and means controlled by the member arranged to control the actuating force of said electroresponsive actuating means to render the rate of movement of the member proportional to the rate of variation in temperature of the conductor due to the current flowing therein.

6. In a time element protective device for electrical apparatus, the combination of a movable member, electroresponsive actuating means for said member, adapted to be energized responsively to the current of the electrical apparatus, and means controlled by the member arranged to render the movement of the member proportional to the temperature of the electrical apparatus due to the heating effect of the current flowing therein.

7. A protective device for electrical apparatus having predetermined thermal characteristics comprising a movable member, an electroresponsive actuating means therefor arranged to move the member upon the flow of current through the electrical apparatus, and means controlled by the member for maintaining the movement of the member proportional to the temperature rise of the electrical apparatus due to the heating effect of the current flowing therein.

8. In a time element protective device for an electric circuit, the combination of a movable member, actuating means therefor comprising cooperating electroresponsive elements differentially connected to said member to exert opposing actuating forces thereupon, each of said elements being adapted to be energized both in accordance with an electrical characteristic of the circuit and independently of said characteristic, and means associated with said member whereby upon movement of the member the independent energization of each of said elements is varied to maintain the rate of movement of the member in accordance with the rate of change of a predetermined function dependent upon said electrical characteristic.

9. In a time element protective device for an electric circuit, the combination of a movable controlling member, actuating means therefor comprising two electroresponsive elements each having a winding adapted to be energized in accordance with the current of the protected circuits, said elements having an energizing source independent of the current in the circuit and being differentially connected to said member and arranged to exert unequal and opposing actuating forces thereupon, and means controlled by the said member for varying the independent energization of said elements to maintain the movement of the member in accordance with a predetermined function dependent upon the current of the circuit.

10. In a time element protective device for electrical apparatus, the combination of a movable controlling member, two variable speed differentially connected electric motors for moving said member responsively to the difference in the speeds of the motors and means associated with said member whereby upon movement of the member the energization of said motors is controlled automatically to maintain the movement of the member in accordance with a predetermined function of time.

11. A protective device for electrical apparatus having predetermined thermal characteristics comprising a movable member, a pair of cooperating electric motors, each adapted to be energized responsively to the current of the protected electrical apparatus, differential gearing operatively connecting said motors with said member to operate the same responsively to the difference in speed of the motors, and means controlled by the member and arranged to oppositely vary the speeds of the motors upon movement of the member to maintain the rate of movement of the member in accordance with the rate of change of a predetermined function dependent upon the current of the protected electrical apparatus.

12. A time element temperature protective device for electrical apparatus having predetermined thermal characteristics comprising a movable temperature indicating member, actuating means therefor comprising electroresponsive elements differentially connected to said member and adapted to be energized responsively to the current of the protected electrical apparatus to exert unequal and opposing actuating forces upon said member, and means for oppositely varying the actuating forces of said elements upon movement of said member to maintain the movement of the member proportional to the temperature rise of the electrical apparatus due to the heating effect of the current flowing therein.

In witness whereof, I have hereunto set my hand this 7th day of August, 1925.

MICHEL CRÉMER.